United States Patent
Brewerton et al.

(10) Patent No.: US 8,880,961 B2
(45) Date of Patent: Nov. 4, 2014

(54) SYSTEM AND METHOD OF COMPUTATION BY SIGNATURE ANALYSIS

(75) Inventors: Simon Brewerton, Trowbridge (GB); Neil Hastie, Lydney (GB); Glenn Farrall, Long Ashton (GB); Boyko Traykov, Munich (DE); Antonio Vilela, Mering (DE)

(73) Assignee: Infineon Technologies AG, Neubiberg (DE)

( * ) Notice: Subject to any disclaimer, the term of this patent is extended or adjusted under 35 U.S.C. 154(b) by 362 days.

(21) Appl. No.: 13/362,433

(22) Filed: Jan. 31, 2012

(65) Prior Publication Data

US 2013/0198571 A1    Aug. 1, 2013

(51) Int. Cl.
G06F 11/00    (2006.01)

(52) U.S. Cl.
USPC ........................................ 714/47.1

(58) Field of Classification Search
USPC .............................. 714/47.1–47.3
See application file for complete search history.

(56) References Cited

U.S. PATENT DOCUMENTS

| | | | |
|---|---|---|---|
| 5,604,754 A * | 2/1997 | Itskin et al. | 714/798 |
| 5,799,022 A * | 8/1998 | Williams | 714/797 |
| 5,993,055 A * | 11/1999 | Williams | 714/732 |
| 8,429,617 B2 * | 4/2013 | Demetriou et al. | 717/124 |
| 2009/0106614 A1 * | 4/2009 | Desineni et al. | 714/732 |
| 2010/0169693 A1 * | 7/2010 | Mukherjee et al. | 713/375 |
| 2012/0166890 A1 * | 6/2012 | Janarthanam et al. | 714/49 |

* cited by examiner

Primary Examiner — Bryce Bonzo
(74) Attorney, Agent, or Firm — Eschweiler & Associates, LLC

(57) ABSTRACT

A system and method for processing data for use with a microcontroller having a processing unit provides for sending an input data address to a memory as part of a read request for input data stored in the memory, receiving the input data from the memory, generating a plurality of trace signals, generating a first plurality of signatures based upon the plurality of trace signals, receiving a second plurality of corresponding signatures from a second microcontroller, comparing each signature of the first plurality of signatures to each corresponding signature of the second plurality of corresponding signatures, generating a first error signal if the comparison produces at least one mismatch, and utilizing the first error signal to generate one or more disable signals for disabling operation of one or more devices under control of the microcontroller.

20 Claims, 6 Drawing Sheets

SYSTEM AND METHOD OF COMPUTATION BY SIGNATURE ANALYSIS

FIELD

Certain embodiments of the invention relate to providing diagnostic coverage in computational systems and methods. More specifically, certain embodiments of the invention relate to diagnostic signature generation while performing computations, including regeneration of data addresses as regeneration address signatures, for detecting transient and permanent errors.

BACKGROUND

Processing units used in safety-relevant systems typically connect to internal subsystems, such as memories and peripherals, via internal bus systems. A conventional solution for protecting the data and address signals of the bus from communication disturbances is to design redundancy into the system by adding additional communication lines which provide error correction and detection capabilities. However, due in part to "state of the art" design methodologies in which some "bus" structures are no longer physically identifiable and/or easily accessible for application of conventional error correction and detection capabilities, estimating the error probabilities of communication channels may be computationally intense and inaccurate. In typical systems, the logic that lies behind addressing interfaces of processing units, such as the logic associated with address decoders and address buses inside memories and peripherals external to the processing unit, are not protected by conventional error correction and detection capabilities.

Furthermore, conventional redundancy and/or algorithm diversity provides a typical solution for addressing fail-safe operation of processing units. For example, a processing channel may be time multiplexed to perform two (or more) diverse algorithms, the results of which are periodically cross checked for consistency and/or plausibility. Alternatively a single algorithm may be executed with temporal separation on two (or more) processing channels, the results of which are also periodically cross checked for consistency and/or plausibility.

However, if time multiplexing of a single processing channel is used, the application developer must build several diverse algorithms, define a suitable "pass" limit for the respective sets of results, and monitor the scheduling of time multiplexing. Furthermore, the failure reaction time of the system is limited to the time required to fully compute the diverse algorithms.

If dual processing of a single algorithm is used, each processing channel must be independent so that common cause failures are minimized and failure in one channel does not affect the other channel. In addition, the data used by the computation must be protected against corruption, and the software and software development process must be of a proven quality.

It would be desirable to provide comprehensive, efficient diagnostic coverage of computation faults associated with operation of a processing unit within a computational system, including fault coverage associated with communication and storage of data within internal sub-systems of peripherals and memories of the computational system.

SUMMARY

According to an embodiment of the invention, a microcontroller comprises a processing unit configured to generate a plurality of trace signals, a signature analysis unit coupled to the processing unit and to a second signature analysis unit of a second processing unit via a signature pipe, and a port logic unit coupled to the signature analysis unit. In one embodiment, the plurality of trace signals comprises an input data, an input data address, one or more internal states of the processing unit, an output data and an output data address. The signature analysis unit is configured to generate a first plurality of signatures based upon one or more trace signals of the plurality of trace signals, receive a second plurality of corresponding signatures via the signature pipe, compare each signature of the first plurality of signatures with each corresponding signature of the second plurality of corresponding signatures, and generate a first error signal if the comparison produces at least one mismatch. The port logic unit is configured to generate a device disable signal based upon the first error signal.

According to another embodiment of the invention, a signature analysis unit for use with a processing unit of a microcontroller and one or more other processing units of one or more other microcontrollers comprises a signature generation unit configured to receive a plurality of trace signals from the processing unit and generate a first plurality of signatures based upon one or more trace signals of the received plurality of trace signals. The signature analysis unit further comprises a first FIFO buffer configured to receive the first plurality of signatures, a second FIFO buffer configured to receive a plurality of corresponding signatures based upon a plurality of corresponding trace signals generated by one or more of the other processing units, and a signature comparator configured to receive the first plurality of signatures and the plurality of corresponding signatures, compare each signature of the first plurality of signatures with each corresponding signature of the plurality of corresponding signatures, and generate a first error signal if the comparison produces at least one mismatch.

In another embodiment of the invention, a system comprises a microcontroller including a processing unit configured to generate a plurality of trace signals and a signature analysis unit coupled to the processing unit and to a second signature analysis unit of a second processing unit via a signature pipe. The system further comprises a memory coupled to the microcontroller. The signature analysis unit is configured to generate a first plurality of signatures based upon one or more trace signals of the plurality of trace signals, receive a second plurality of corresponding signatures via the signature pipe, compare each signature of the first plurality of signatures with each corresponding signature of the second plurality of corresponding signatures, and generate a first error signal if the comparison produces at least one mismatch. In one embodiment, the first plurality of signatures comprises an input data signature, an input address signature, a processing state signature, an output data signature, and an output address signature.

Furthermore, the memory comprises an address decoder configured to receive an input data address associated with a read request for the input data stored in the memory, and an address regeneration unit configured to generate a regeneration address signature based upon bit and word lines driven when the input data is read from the memory. The signature analysis unit is configured to receive the regeneration address signature and compare an input address signature (based upon the input data address) with the regeneration address signature and generate a second error signal if the comparison produces a mismatch.

According to a further embodiment of the invention, a method for processing data by a microcontroller having a processing unit comprises sending an input data address to a memory as part of a read request for input data stored in the memory, and receiving the input data from the memory. The memory further comprises generating a plurality of trace signals, wherein one or more of the plurality of trace signals are based upon the input data, the input data address, one or more internal processing states of the processing unit, an output data and an output data address. The method also comprises generating a first plurality of signatures based upon the plurality of trace signals, receiving a second plurality of corresponding signatures from a second microcontroller, comparing each signature of the first plurality of signatures to each corresponding signature of the second plurality of corresponding signatures, generating a first error signal if the comparison produces at least one mismatch, and utilizing the first error signal to generate one or more disable signals for disabling operation of one or more devices under control of the microcontroller.

These and other advantages, aspects and novel features of the present invention, as well as details of an illustrated embodiment thereof, will be more fully understood from the following description and drawings.

DETAILED DESCRIPTION

Figure 1:
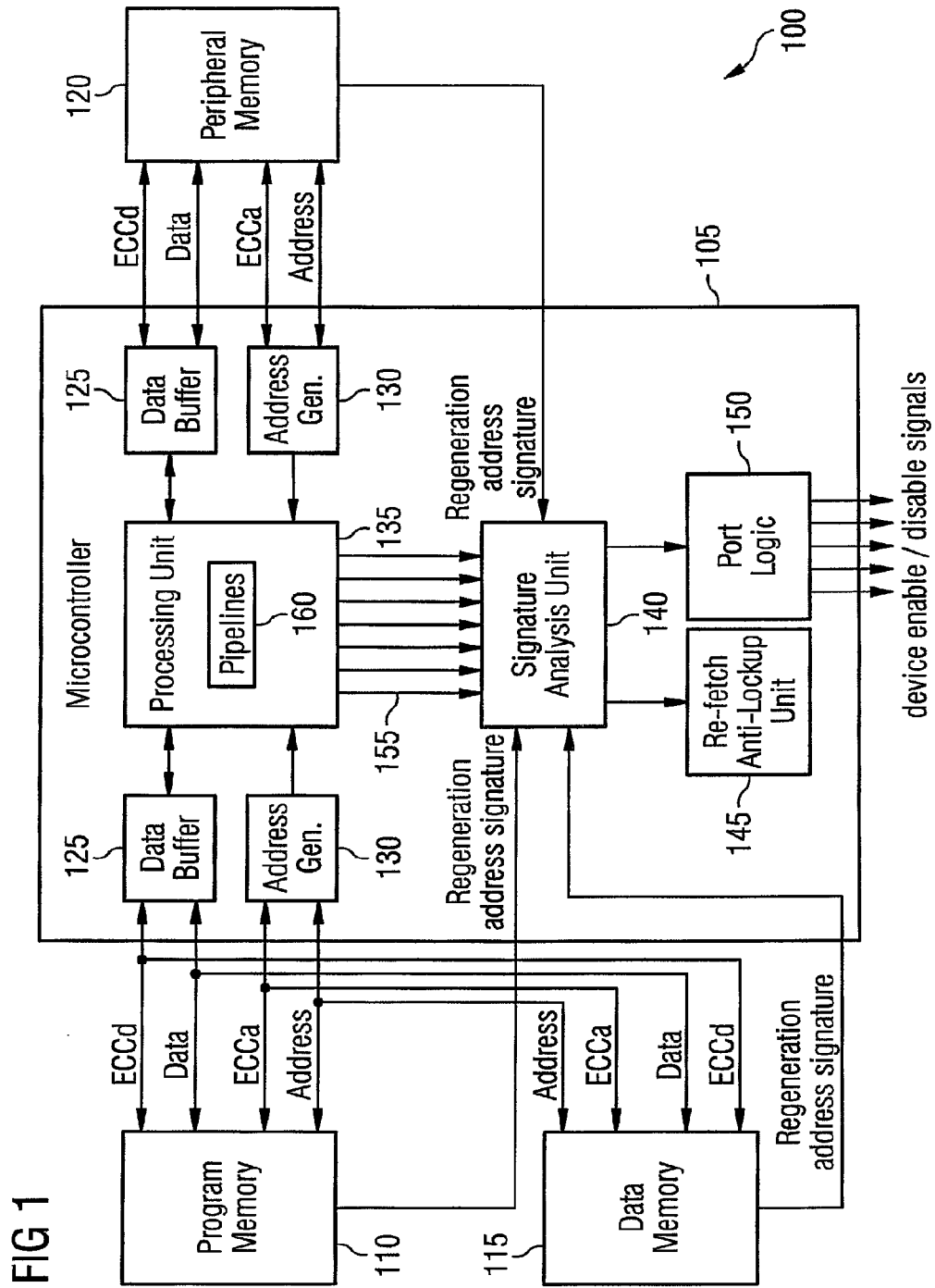
FIG. 1 is a schematic diagram of a computer processing system, according to an embodiment of the invention.

FIG. 1 is a schematic diagram of a computer processing system 100, according to an embodiment of the invention. Components of the computer processing system 100 include a microcontroller 105, a program memory 110 and/or a data memory 115 and/or one or more peripheral memories 120. As illustrated, in one embodiment the microcontroller 105, the program memory 110, the data memory 115 and the one or more peripheral memories 120 are provided on separate die (or separate microchips), however, the scope of the present invention covers any number of die (or microchips) which provide for various combinations of the components of the computer processing system 100.

The microcontroller 105 includes one or more data buffers 125, which may be coupled to one or more internal memories (not shown) via system buses (not shown) and to one or more off-chip memories (not shown) via the system buses and one or more memory controllers and/or I/O interfaces (not shown). The internal and external memories may comprise any combination of volatile random access memory (RAM) and non-volatile read-only memory (ROM) for storing, for example, an operating system (OS) and embedded and/or non-embedded program applications.

The microcontroller 105 also includes one or more address generators 130, a processing unit 135, a signature analysis unit 140, a re-fetch/anti-lockup unit 145, and a port logic unit 150. The processing unit 135 may be, for example, a microprocessor, a central processing unit, or any other type of processing system known to those of skill in the art, configured to receive input data (i.e., read data), corresponding memory addresses of the input data (i.e., input data addresses), and program application instructions, execute the program application instructions, and generate output data (write data) and corresponding memory addresses of the output data (i.e., output data addresses). Some or all of the addresses, data, as well as information corresponding to one or more internal states of the processing unit 135 may be transmitted as trace signals 155 from the processing unit 135 to the signature analysis unit 140. In one embodiment, the trace signals 155 are generated by processing pipelines 160 of the processing unit 135. The information corresponding to the internal states may be information corresponding to internal operation of the processing unit 135, such as opcodes, flags, branches, interrupt states, as well as other state information, for example.

As known to those of skill in the art, error correction codes (ECC) are used to verify data and data address transmissions by locating and correcting transmission errors. ECC ensures that the data and addresses corresponding to the data (i.e., data addresses) being sent from the data buffers 125 and address generators 130, respectively, to the program memory 110, the data memory 115, and the one or more peripheral memories 120, are received without transmission error. If the ECC indicates an error in the transmission of the data and/or data addresses, then either the data and/or data addresses may need to be retransmitted, or the program memory 110, data memory 115 and/or peripheral memory 120 are configured to use the received ECC to correct the corresponding data and/or data address transmission errors in real time, or the microcontroller 105 may generate disable signals that disable from operation one or more devices or sub-systems controlled by the microcontroller 105, for example.

In addition, the processing unit 135 may receive input (i.e., read) data from the data buffers 125 and transmit output (i.e., write) data (i.e., data generated by the processing unit, for example) to the data buffers 125. The processing unit 135 may also receive input (i.e., read) data addresses via the address generators 130, and may transmit address information corresponding to generated data (i.e., output or write data) to the address generators 130 for translation to output data addresses.

In operation, the signature analysis unit 140 receives the trace signals 155 from the pipelines 160 of the processing unit 135 and regeneration address signatures from one or more of the program memory 110, data memory 115 and peripheral memory 120 (i.e., collectively referred to as external memory) based upon bit and word lines driven in the external memory when accessing the input data stored in the external memory. The regeneration address signatures will be discussed more fully below in conjunction with FIG. 2.

The signature analysis unit 140 is configured to perform diagnostics on one or more of the input data, output data, internal states of the processing unit 135, input data addresses and output data addresses (i.e., the processing diagnostic variables) as transmitted by the trace signals, as well as utilize the regeneration address signatures, to determine whether either transient or permanent errors have occurred with respect to the generation, communication (via system buses, for example, internal to the program memory 110, data memory 115, peripheral memory 120 and/or microcontroller 105) and/or storage of any of the processing diagnostic variables, as well as provide address validation for read data from memories 110, 115 and/or 120. Analysis of the processing diagnostic variables provides a means to verify error-free operation of the processing unit 135.

If one or more errors are detected, then the microcontroller 105 may implement one or more actions, including, but not limited to, re-fetching data from program memory 110, data memory 115 or one or more peripheral memories 120 via the re-fetch/anti lockup unit 145, and/or applying appropriate port logic via the port logic unit 150 to disable from operation one or more devices or sub-systems controlled by the microcontroller 105. The signature analysis unit 140 will be discussed in more detail further below in conjunction with FIG. 3.

Figure 2:
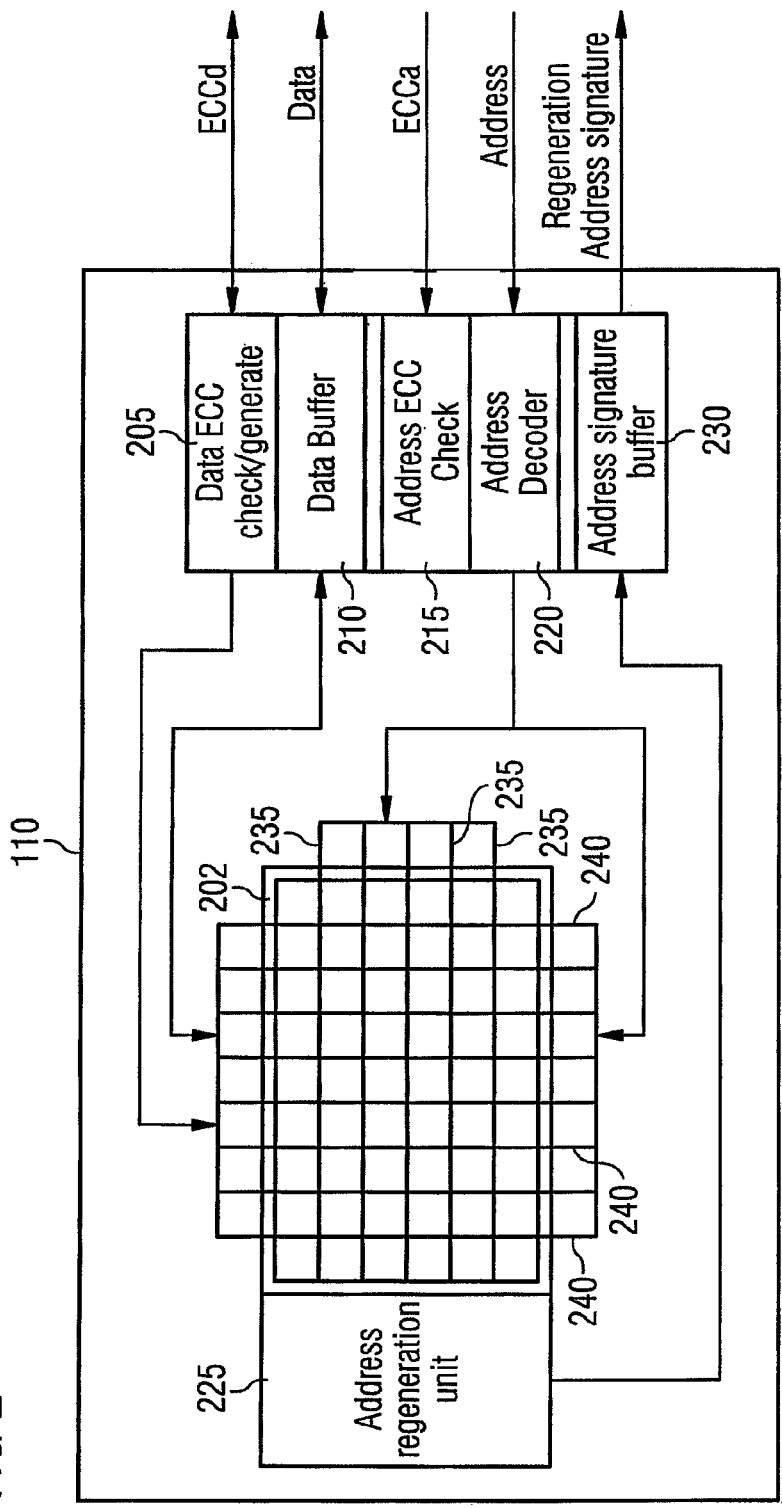
FIG. 2 is a schematic diagram of the program memory illustrated in FIG. 1, according to an embodiment of the invention.

FIG. 2 is a schematic diagram of the program memory 110 of FIG. 1, according to an embodiment of the invention. As illustrated, the program memory includes a memory array 202 comprising a plurality of memory cells addressed (i.e., accessed) by word lines 235 and bit lines 240, a data ECC check/generate unit 205, a memory data buffer 210, an address ECC check unit 215, an address decoder 220, an address regeneration unit 225 for generating and optionally encoding regeneration address signatures, and an address signature buffer 230. The program memory 110 may also include internal buses (not shown) that provide for the communication of the addresses, data, ECC, and regeneration address signatures, as well as any bias and control signals, between the internal components of the program memory 110.

The memory data buffer 210 is configured to receive write data from the data buffer 125 of the microcontroller 105 and the data ECC check/generate unit 205 is configured to receive an $ECC_d$ that has been applied to the write data (also referred to as the $ECC_d$ of the write data). The address decoder 220 is configured to receive write data addresses corresponding to the received write data and the address ECC check unit 215 is configured to receive an $ECC_a$ that has been applied to the corresponding write data addresses (also referred to as the $ECC_a$ of the write data addresses).

In operation, the data ECC check/generate unit 205 provides a communication interface between the microcontroller 105 and the program memory 110, and is configured to check the received write data for transmission errors using the corresponding received $ECC_d$ of the write data, and transmit the received write data and the corresponding $ECC_d$ to the specific memory cell according to the bit and word lines driven by the corresponding write data address received and decoded by the address decoder 220. The data ECC check/generate unit 205 is also configured to receive read data and a corresponding $ECC_d$ of the read data from a specific cell in the memory array 202 based upon a read data address received from the microcontroller 105 (and decoded) by the address decoder 220, check the received read data using the corresponding $ECC_d$ of the read data for transmission errors, and transmit the received read data and the corresponding $ECC_d$ of the read data to the microcontroller 105.

As discussed above, the ECC check/generate unit 205 checks the write data received from the microcontroller 105 or the read data received from a specific memory storage cell, using the received corresponding $ECC_d$ of the write or read data, for transmission errors. In one embodiment, upon discovering one or more transmission errors, the ECC check/generate unit 205 corrects the errors in the data, and enables the transmission of the data and the corresponding $ECC_d$ of the data to the appropriate destination (i.e., either the microcontroller 105 or a memory cell). In another embodiment, upon discovering one or more transmission errors, the ECC check/generate unit 205 corrects the errors in the data, generates a new $ECC_d$ of the corrected data, and enables the transmission of the data and the corresponding new $ECC_d$ of the data to the appropriate destination.

The address regeneration unit 225 generates a regeneration address signature based upon specific bit and word lines driven when stored data is read from the memory array 202, and transmits the regeneration address signature to the microcontroller 105 via the address signature buffer 230. For example, the program memory 110 may receive a read request for data from the microcontroller 105 and/or the address decoder 220 may receive a read data address of the requested data and the address ECC check unit 215 may receive the $ECC_a$ of the read data address. After the address ECC check unit 215 performs any necessary error correction on the received read data address using the received $ECC_a$ of the read data address, the requested read data and the corresponding $ECC_d$ of the requested read data are read from the memory array 202 according to the specific bit and word lines driven according to the received read data address. The microcontroller 105 receives the requested read data (i.e., also referred to as the input data) and the $ECC_d$ of the requested read data. The address regeneration unit 225 generates a regeneration address signature based upon the specific bit and word lines driven when the requested read data is accessed from the memory array 202, and transmits the regeneration address signature to the signature analysis unit 140 of the microcontroller 105 via the address signature buffer 230.

In one embodiment, the regeneration address signature is a lossless encoding of the regeneration address. In another embodiment, the regeneration address signature is an uncompressed regeneration address. However, the scope of the present invention includes a regeneration address signature embodied as any electronic representation of the bit and word lines actually driven upon each access of the memory array 202.

The regeneration address signature may be stored in the address signature buffer 230 before being transmitted to the microcontroller 105. In one embodiment, the regeneration address signature is transmitted to the microcontroller 105 upon each read and/or write access of the memory array 202. A memory access occurs when data, such as a data packet, is either read or written to the memory array 202. As discussed further below in conjunction with FIG. 3, the signature analysis unit 140 of the microcontroller 105 is configured to receive the regeneration address signature and check for consistency of the address. For example, in one embodiment the signature analysis unit 140 compares the regeneration address signature with an address signature generated by the signature analysis unit 140 based upon the read data address. Since the processing unit 135, which receives input data and input data addresses, is located some distance from the address decoders and drivers used to control the memory array 202, the signature analysis unit 140 may diagnose the status of any internal conductive lines which typically cross the program memory 110. Additionally, in one embodiment the processing unit 135 can be built in slower technologies or with longer set-up-and-hold timing requirements, such that if expected timing of the address generator unit is slower than expected then the signature generation will be more susceptible to the slower timing than the memory, hence producing an incorrect signature before the memory would produce erroneous data. This guarantees that the signature mechanism always triggers first in case of a timing violation.

In further exemplary embodiments of the invention, the data memory 115 and the one or more peripheral memories 120 have the same components with the same reference numbers as the program memory 110, and generate regeneration address signatures in the same manner.

Figure 3:
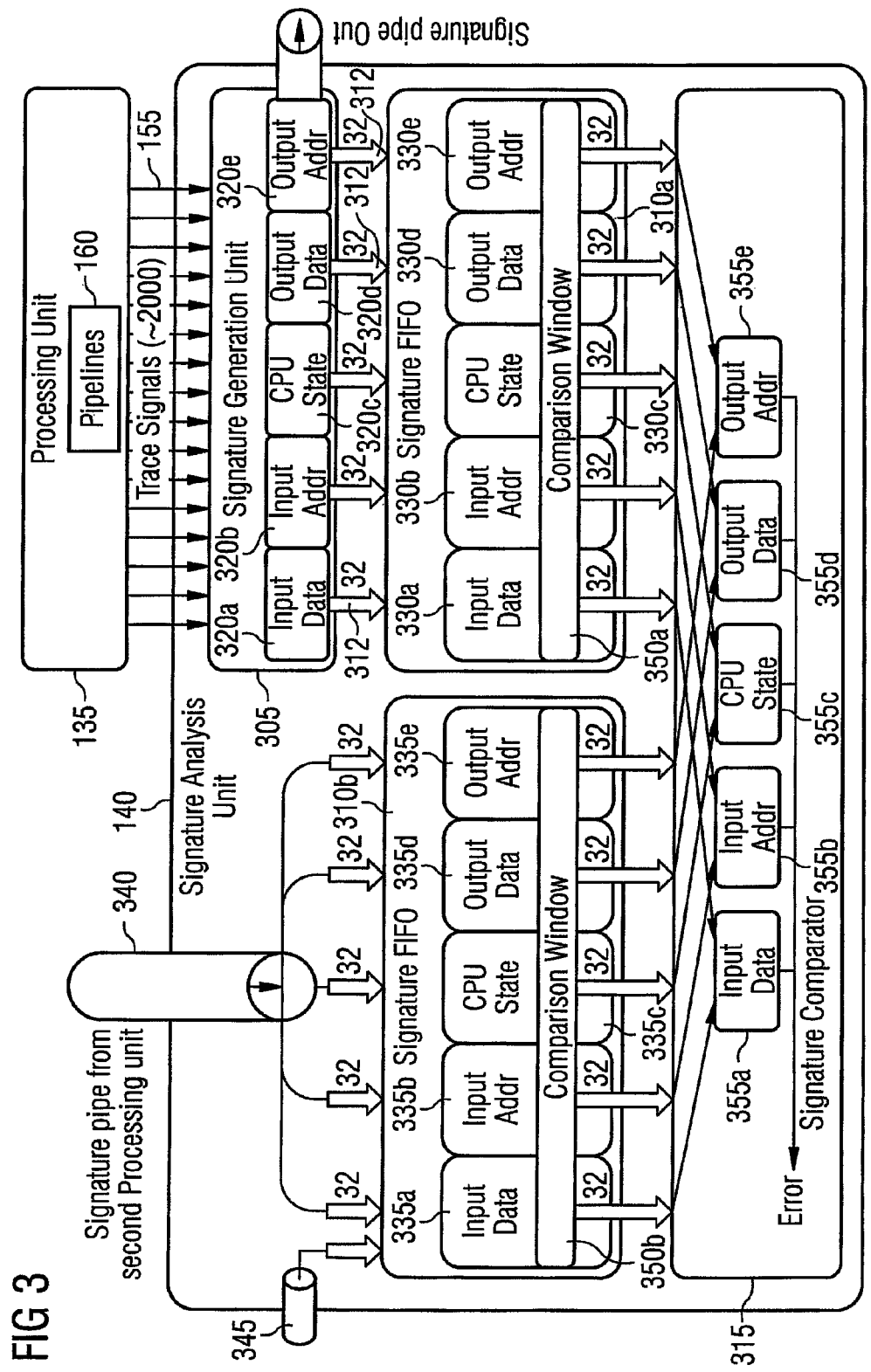
FIG. 3 is a schematic diagram of the signature analysis unit of the microcontroller illustrated in FIG. 1, according to an embodiment of the invention.

FIG. 3 is a schematic diagram of the signature analysis unit 140 of the microcontroller 105 illustrated in FIG. 1, according to an embodiment of the invention. The signature analysis unit 140 includes a signature generation unit 305, two signature first-in-first-out (FIFO) buffers 310a-310b, and a signature comparator 315. The signature generation unit 305 is configured to receive the trace signals 155 from the pipelines 160 of the processing unit 135, process the trace signals to generate the signatures 312, and send the signatures 312 to one or more of the signature FIFO buffers 310a-310b for post processing.

As illustrated, the signature analysis unit 140 includes the two signature FIFO buffers 310a-310b for storing and aligning the signatures 312 generated by two different processing threads of the processing unit 135, and/or for storing and aligning signatures derived from two different processing units. However, the scope of the present invention also includes the signature analysis unit 140 comprising any number of FIFO structures in order to enable storage and alignment of signatures generated by any number of processing threads per processing unit and/or signatures derived from any number of different processing units.

In one embodiment, a signature may include one or more signature fields. The signature comparator 315 is configured to receive and compare a signature field(s) of a signature stored in the first FIFO buffer 310a with an aligned (i.e., corresponding) signature field(s) of signatures stored in the second FIFO buffer 310b. Although the scope of the present invention covers any technique of aligning two or more signatures, for example, each of the signatures may have one or more signature fields comprised of one or more unique indices used as markers for aligning the two or more signatures. In one embodiment, if the signature comparator 315 determines that a discrepancy (i.e., a mismatch) exists between any of the one or more compared signature fields, the signature comparator 315 may trigger a "system event." For example, the signature comparator 315 may trigger a hardware trap and/or a pin toggle that disables one or more devices (not shown) that are controlled by the microcontroller 105. In another embodiment, the signature comparator 315 may generate error signal (s) that enable software or firmware to issue control signals and/or instructions to re-fetch data from the program memory 110 and/or the data memory 115 and/or the peripheral memory 120, and/or to cause the processing unit 135 to repeat one or more program application execution steps that led to the creation of the error signal(s).

As illustrated, the signature generation unit 305 includes an input data trace processing block 320a for generating input data signatures from one or more of the trace signals 155, an input address trace processing block 320b for generating input address signatures from one or more of the trace signals 155, a CPU (also referred to as a processing unit) state trace processing block 320c for generating CPU state signatures from one or more of the trace signals 155, an output data trace processing block 320d for generating output data signatures from one or more of the trace signals 155, and an output address trace processing block 320e for generating output address signatures from one or more of the trace signals 155.

In one embodiment, the trace processing blocks 320a-320e are five cyclic redundancy check (CRC) polynomial algorithm blocks. The CRC polynomial algorithm blocks may generate a new set of signatures upon execution of every program instruction by the processing unit 135. According to another embodiment, the CRC polynomial algorithm blocks are configured (or controlled) to generate a new set of signatures only upon execution of one or more specific code instructions or specific code sequences, sequential or non-sequential, in order to restrict the total number of signatures generated. In one embodiment, software executed by the processing unit 135, or executed external to the processing unit 135, may enable modification of the variables and/or constants that comprise the CRC polynomial algorithm blocks, and the software may enable any of these variables and/or constants to be viewed by a user.

The signature generation unit 305 may optionally include an input data register (not shown) for storing input data signatures generated by the input data trace processing block 320a, an input address register (not shown) for storing input address signatures generated by the input address trace processing block 320b, a CPU state register (not shown) for storing CPU state signatures generated by the CPU state trace processing block 320c, an output data register (not shown) for storing output data signatures generated by the output data trace processing block 320d, and an output address register (not shown) for storing output address signatures generated by the output address trace processing block 320e.

Although the signature generator 305 includes five trace processing blocks 320a-320e and may optionally include five corresponding signature registers, the scope of the present invention covers any number of trace processing blocks and any number of corresponding signature registers.

As illustrated, the first FIFO buffer 310a includes a first input data signature buffer 330a configured to store first input data signatures received from the signature generation unit 305, a first input address signature buffer 330b configured to store first input address signatures received from the signature generation unit 305, a first CPU state signature buffer 330c configured to store first CPU state signatures received from the signature generation unit 305, a first output data signature buffer 330d configured to store first output data signatures received from the signature generation unit 305, and a first output address signature buffer 330e configured to store first output address signatures received from the signature generation unit 305.

The second FIFO buffer 310b comprises a second input data signature buffer 335a configured to store second input data signatures received via a signature pipe 340 from a second signature generation unit (not shown) of a second processing unit (not shown), a second input address signature buffer 335b configured to store second input address signatures received via the signature pipe 340 and/or store regeneration address signatures received via a bus 345 coupled to the regeneration address signature buffer 230 of the program memory 110, a second CPU state signature buffer 335c configured to store second CPU state signatures received via the signature pipe 340, a second output data signature buffer 335d configured to store second output data signatures received via the signature pipe 340, and a second output address signature buffer 335e configured to store second output address signatures received via the signature pipe 340.

In another embodiment, the signatures received via the signature pipe 340 are not generated by a second signature generation unit (not shown) of a second processing unit (not shown), but are reference signatures. For example, the reference signatures are the expected signatures known to be produced by the processing unit 135 executing a predetermined code sequence.

Although as illustrated, the signature analysis unit 140 includes two signature buffers 310a-310b implemented as two FIFO buffers, the scope of the present invention covers any memory buffers, such as circular buffers, random access buffers, linked list buffers, or combination of memory structures, configured to buffer the signatures received from the signature generation units, signature pipes and/or buses.

In one embodiment, one or more of the first signatures within a first comparison window 350a and one or more of the second signatures within a second comparison window 350b are periodically transmitted to the signature comparator 315.

The scope of the present invention includes embodiments in which the processing unit 135 and a second processing unit (not shown) are integrated on the same or on different dies as the microcontroller 105. In another embodiment, the signature analysis unit 140 of the microcontroller 105 includes three or more signature FIFO buffers, where each FIFO buffer is coupled to a different signature generation unit coupled to a different processing unit.

As illustrated, the signature comparator 315 includes an input data signature processing block 355a, an input address signature processing block 355b, a CPU state signature processing block 355c, an output data signature processing block 355d, and an output address signature processing block 355e. In operation, each of the processing blocks 355a-355e compare received first and second signatures, and if one or more of the processing blocks determine that the received first and second signatures do not match (i.e., a discrepancy or a mismatch occurs), then the one or more processing blocks 355a-355e generate an error signal(s).

Under normal (i.e., error-free) operating conditions (i.e., when the signature analysis unit 140 is not generating any error signals), the port logic unit 150 generates system enable signals that enable operation of other devices and/or sub-systems external to the microcontroller 105. In one embodiment, when the port logic unit 150 receives an error signal E1 generated by the signature comparator 315, the port logic block 150 generates one or more system disable signals that disable one or more devices or sub-systems from operating, based partly upon whether the error signal was generated by the input data signature processing block 355a and/or the input address signature processing block 355b and/or the CPU state signature processing block 355c and/or the output data signature processing block 355d and/or the output address signature processing block 355e.

In another embodiment, if the signature comparator 315 generates an error signal E2 because of a mismatch between a regeneration address signature (received from the program memory 110, the data memory 115 and/or the peripheral memory 120 via the second signature pipe 345 via the second input address buffer 335b) and a corresponding first input address signature received from the signature generation unit 305 via the first input address buffer 330b, implying that the input data that was requested to be read from the memories 110, 115 and/or 120 is not the same as the data that was actually read from the memories, then the re-fetch/anti-lockup unit 145, upon receiving the error message E2, sends a second request for the input data to be read from the memories 110, 115 and/or 120. The comparison of the regeneration address signature, representing the actual address accessed in the memories 110, 115 and/or 120 associated with a read request for input data, with the input address signature received from the signature generation unit 305, representing the address of the input data requested (i.e., the input data address sent to memories 110, 115 and/or 120 from the one or more address generators 130), provides a system and method for address validation.

Figure 4:
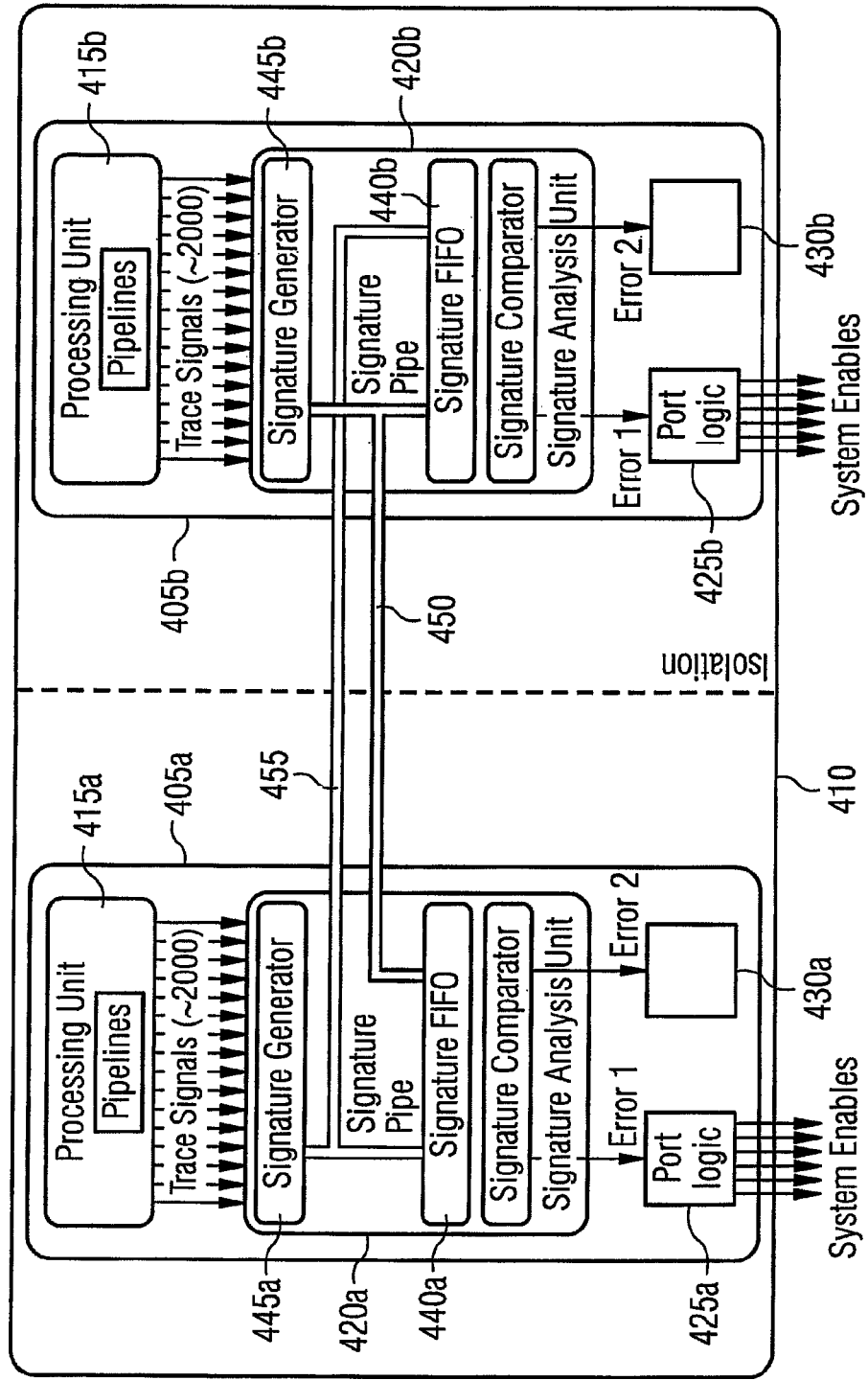
FIG. 4 is a schematic diagram illustrating two microcontrollers integrated on a single die, according to an embodiment of the invention.

FIG. 4 is a schematic diagram illustrating two microcontrollers 405a and 405b integrated on a single die 410, according to an embodiment of the invention. The microcontrollers 405a and 405b may be identical to the microcontroller 105 depicted in FIG. 1. As illustrated in FIG. 4, the die 410 (i.e., a microcontroller die) includes a first microcontroller 405a comprising a first processing unit 415a coupled to a first signature analysis unit 420a coupled to a first port logic unit 425a and a first re-fetch/anti-lockup unit 430a, and a second microcontroller 405b comprising a second processing unit 415b coupled to a second signature analysis unit 420b coupled to a second port logic unit 425b and a second re-fetch/anti-lockup unit 430b.

A first signature FIFO buffer 440a receives first signatures from a first signature generator 445a and second signatures via a second signature pipe 450 from a second signature generator 445b. A second signature FIFO buffer 440b receives second signatures from the second signature generator 445b and first signatures via a first signature pipe 455 from the first signature generator 445a. In one embodiment, the first microcontroller 405a is electrically and thermally isolated from the second microcontroller 405b via an intra-die isolation mechanism. In one embodiment, the intra-die isolation mechanism may comprise a deep trench. The scope of the invention covers other isolation mechanisms known to those of skill in the art, implemented alone or in combination.

In another embodiment of the invention, the signature pipes 450 and 455 are low bandwidth pipes, in comparison to bandwidths of typical intra-die connections. The use of low bandwidth pipes allow unique power networks and clock systems to be used for the implementation of the signature pipes.

Figure 5:
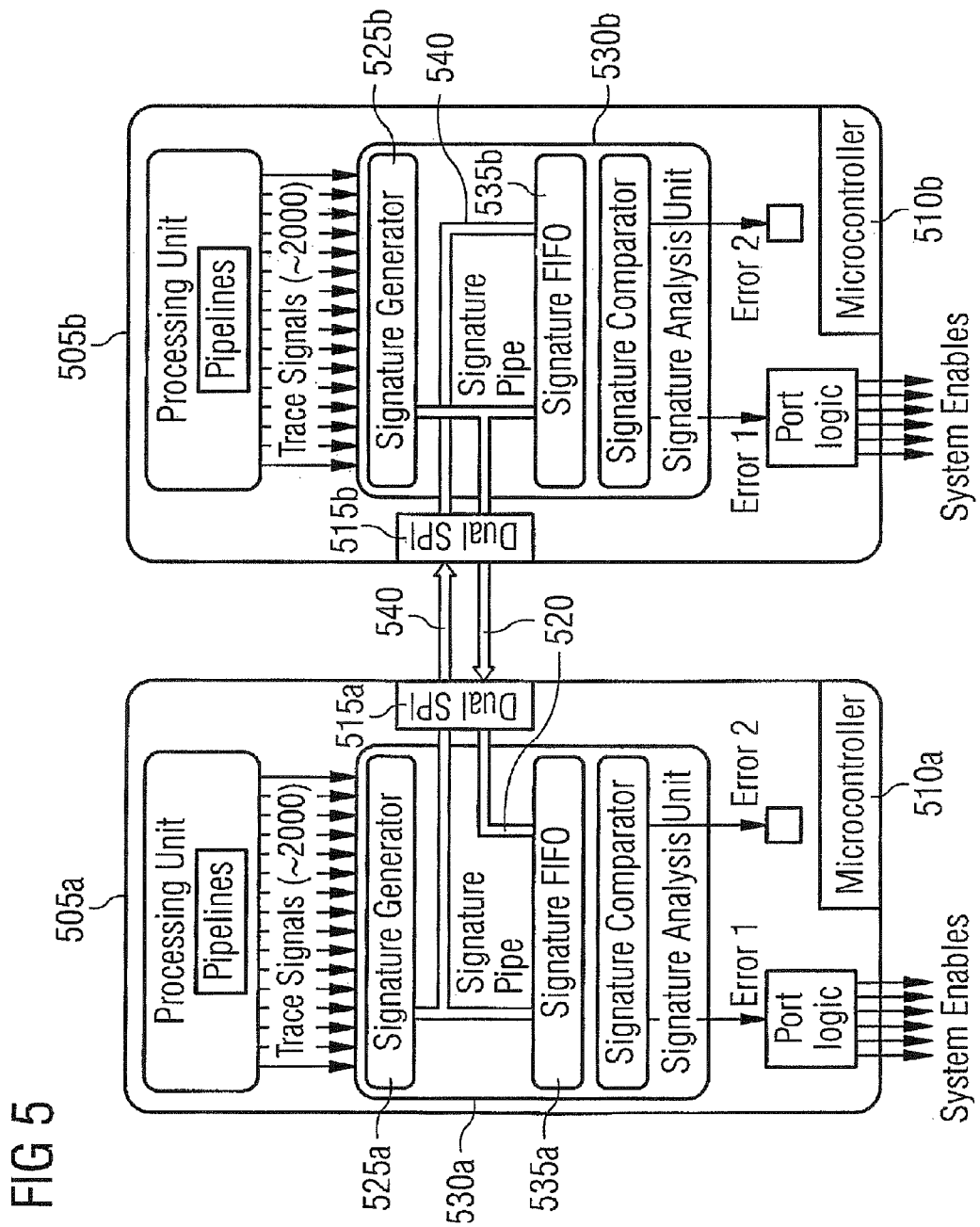
FIG. 5 is a schematic diagram illustrating two microcontrollers integrated on separate dies, according to an embodiment of the invention.

FIG. 5 is a schematic diagram illustrating two microcontrollers integrated on separate dies, according to an embodiment of the invention. As illustrated, a first microcontroller 505a is integrated on a first die 510a, a second microcontroller 505b is integrated on a second die 510b, and the first and second microcontrollers are communicatively coupled by serial interfaces. In one embodiment, the first microcontroller 505a includes a first dual serial peripheral interface (first dual SPI) 515a for receiving second signatures via a second pipeline 520 from a second signature generator 525b of a second signature analysis unit 530b, and transmitting first signatures generated by a first signature generation unit 525a of a first signature analysis unit 530a to a second signature FIFO 535b via a first pipeline 540. The second microcontroller 505b includes a second dual SPI 515b for receiving first signatures via the first pipeline 540 from the first signature generator 525a of the first signature analysis unit 530a, and transmitting second signatures generated by the second signature generation unit 525b of the second signature analysis unit 530b to a first signature FIFO 535a via the second pipeline 520.

Figure 6:
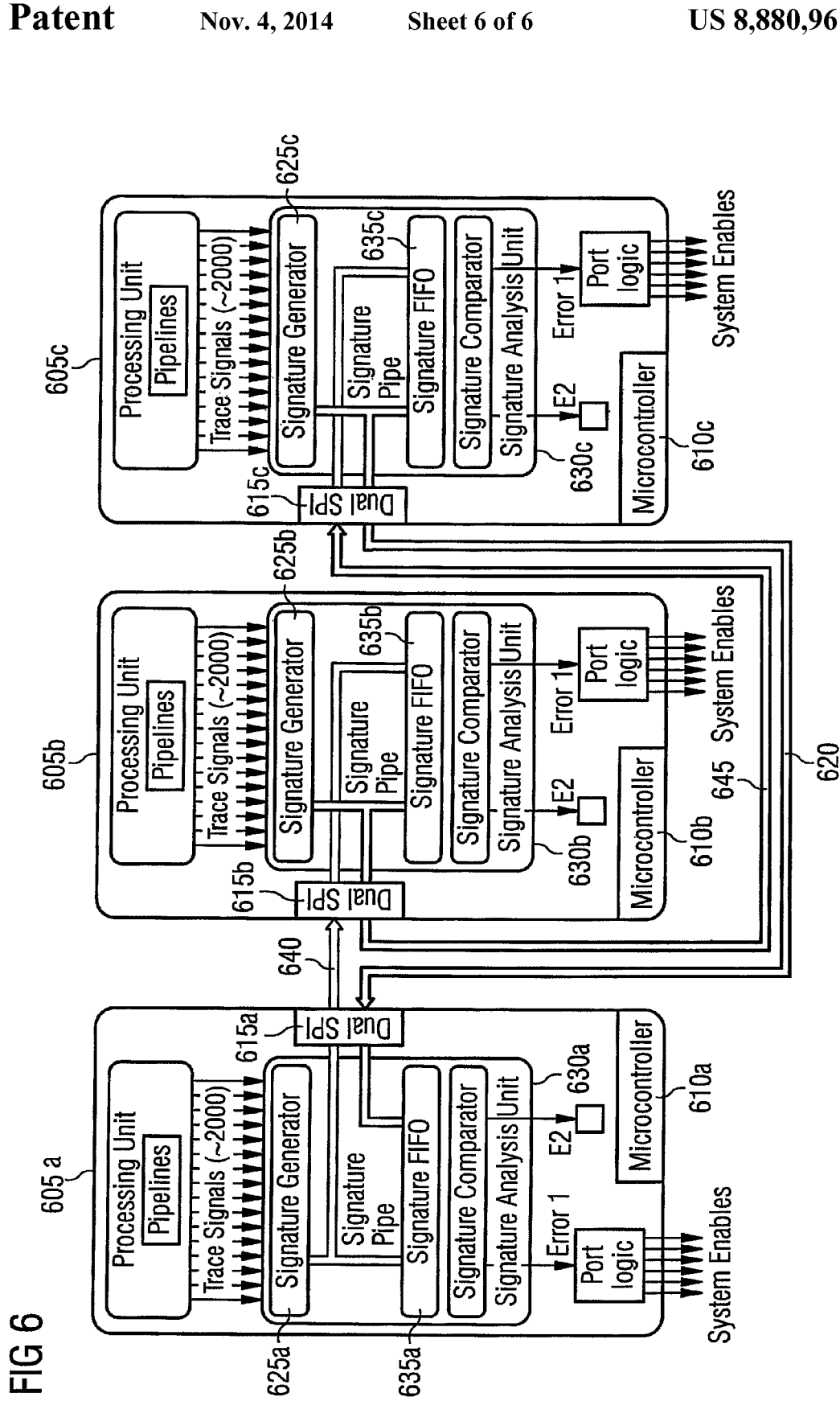
FIG. 6 is a schematic diagram illustrating cross-coupling of microcontrollers integrated on separate dies, according to an embodiment of the invention.

FIG. 6 is a schematic diagram illustrating cross-coupling of microcontrollers integrated on separate dies, according to an embodiment of the invention. As illustrated, a first microcontroller 605a is integrated on a first die 610a, a second microcontroller 605b is integrated on a second die 610b, a third microcontroller 605c is integrated on a third die 610c, and pairs of microcontrollers are communicatively coupled by dual SPIs.

In one embodiment, the first microcontroller 605a includes a first dual SPI 615a for receiving third signatures via a third pipeline 620 from a third signature generation unit 625c of a third signature analysis unit 630c, and transmitting first signatures generated by a first signature generation unit 625a of a first signature analysis unit 630a to a second signature FIFO 635b via a first pipeline 640. The second microcontroller 605b includes a second dual SPI 615b for receiving first signatures via the first pipeline 640 from the first signature generation unit 625a of the first signature analysis unit 630a, and transmitting second signatures generated by a second signature generation unit 625b of a second signature analysis unit 630b to a third signature FIFO 635c via a third pipeline 645 The third microcontroller 605c includes a third dual SPI 615c for receiving second signatures via the third pipeline 645 from the second signature generation unit 625b of the second signature analysis unit 630b, and transmitting third signatures generated by the third signature generation unit 625c of the third signature analysis unit 630c to the first signature FIFO 635a via the third pipeline 620.

Although FIG. 6 depicts cross-coupled microcontrollers located on separate die, the scope of the invention covers similar cross-coupling connection architecture when multiple microcontrollers are located on a single die or when some of the microcontrollers are located on a single die and other microcontrollers are located on separate dies (i.e., hybrid systems). The asymmetric properties of generating local signatures and comparing against signatures generated by other processing units allows any number of processing cores to be compared in real-time, allowing multi-core, multi-processor and hybrid systems to be constructed. Additionally, although FIGS. 5 and 6 illustrate microcontrollers including dual SPIs, the scope of the invention covers microcontrollers including all types of serial and parallel communication buses.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A microcontroller, comprising:
    a processing unit configured to generate a plurality of trace signals, one or more trace signals of the plurality of trace signals comprising an input data, an input data address, one or more internal states of the processing unit, an output data and an output data address;
    a signature analysis unit coupled to the processing unit and to a second signature analysis unit of a second processing unit via a signature pipe, the signature analysis unit configured to:
        generate a first plurality of signatures comprising an input address signature based upon one or more trace signals of the plurality of trace signals,
        receive a second plurality of signatures via the signature pipe;
        compare a signature of the first plurality of signatures with a corresponding signature of the second plurality of signatures, and
        generate a first error signal if the comparison produces at least one mismatch; and
        receive a regeneration address signature from an external memory, compare the input address signature with the regeneration address signature, and generate a second error signal if the comparison produces a mismatch.

2. The microcontroller according to claim 1, wherein the signature analysis unit comprises:
    a signature generation unit comprising a plurality of trace processing blocks, the plurality of trace processing blocks configured to receive the plurality of trace signals and generate the first plurality of signatures based upon the one or more trace signals of the plurality of trace signals;
    a first memory buffer configured to receive the first plurality of signatures;
    a second memory buffer configured to receive the second plurality of corresponding signatures; and
    a signature comparator comprising a plurality of signature processing blocks, the plurality of signature processing blocks configured to receive the first plurality of signatures and the second plurality of corresponding signatures, compare each signature of the first plurality of signatures with each corresponding signature of the second plurality of corresponding signatures, and generate the first error signal if the comparison produces the at least one mismatch.

3. The microcontroller according to claim 2, wherein the first plurality of signatures comprises an input data signature, an input address signature, a processing state signature, an output data signature, and an output address signature.

4. The microcontroller according to claim 3, wherein the second memory buffer is further configured to receive the regeneration address signature from the external memory, and the signature comparator is further configured to compare the input address signature with the regeneration address signature and generate the second error signal if the comparison produces a mismatch, wherein the regeneration address signature is based upon bit and word lines driven in the external memory when accessing the input data stored in the external memory and the input address signature is based upon the input data address sent to the external memory when requesting the input data.

5. The microcontroller according to claim 4, wherein the external memory comprises a program memory, a data memory, or a memory of a peripheral device.

6. The microcontroller according to claim 4, further comprising a re-fetch/anti-lockup unit coupled to the signature comparator, the re-fetch/anti-lockup unit configured to repeat the request for the input data from the external memory upon receiving the second error signal.

7. The microcontroller according to claim 6, wherein the re-fetch/anti-lockup unit is further configured to repeat the request for the input data from the external memory only upon receiving the second error signal less than or equal to a predetermined maximum number.

8. The microcontroller according to claim 1, wherein the port logic unit is further configured to transmit the device disable signal to a device controlled by the microcontroller.

9. The microcontroller according to claim 1, wherein the microcontroller is formed on a first die.

10. The microcontroller according to claim 9, wherein the second signature analysis unit and the second processing unit are components of a second microcontroller formed on the first die.

11. The microcontroller according to claim 9, wherein the second signature analysis unit and the second processing unit are components of a second microcontroller formed on a second die.

12. A signature analysis unit for use with a processing unit of a microcontroller and one or more other processing units of one or more other microcontrollers, wherein the processing unit of the microcontroller generates a plurality of trace signals comprising an input data, an input data address, one or more internal states of the processing unit, an output data, and an output data address, and each of the one or more other processing units generate a plurality of corresponding trace signals, the signature analysis unit comprising:

a signature generation unit configured to receive the plurality of trace signals and generate a first plurality of signatures based upon one or more trace signals of the received plurality of trace signals, wherein the first plurality of signatures comprises an input data signature, an input address signature, a processing state signature, an output data signature, and an output address signature;

a first memory buffer configured to receive the first plurality of signatures;

a second memory buffer configured to receive a plurality of corresponding signatures based upon the plurality of corresponding trace signals generated by one of the one or more other processing units; and a signature comparator configured to receive the first plurality of signatures and the plurality of corresponding signatures, compare each signature of the first plurality of signatures with each corresponding signature of the plurality of corresponding signatures, and generate a first error signal if the comparison produces at least one mismatch, wherein the second memory buffer is further configured to receive a regeneration address signature from a memory external to the microcontroller, and the signature comparator is further configured to compare the input address signature with the regeneration address signature and generate a second error signal if the comparison produces a mismatch, wherein the regeneration address signature is based upon bit and word lines driven in the external memory when the processing unit sends the input data address to the external memory in a read request for the input data stored in the external memory and the input address signature is based upon the input data address.

13. A system, comprising:
a microcontroller, comprising:
    a processing unit configured to generate a plurality of trace signals, one or more trace signals of the plurality of trace signals comprising an input data, an input data address, one or more internal states of the processing unit, an output data and an output data address;
    a signature analysis unit coupled to the processing unit and to a second signature analysis unit of a second processing unit via a signature pipe, the signature analysis unit configured to:
        generate a first plurality of signatures based upon one or more trace signals of the plurality of trace signals, wherein the first plurality of signatures comprises an input data signature, an input address signature, a processing state signature, an output data signature, and an output address signature,
        receive a second plurality of corresponding signatures via the signature pipe;
        compare each signature of the first plurality of signatures with each corresponding signature of the second plurality of corresponding signatures, and generate a first error signal if the comparison produces at least one mismatch; and
a memory coupled to the microcontroller, the memory comprising:
    an address decoder configured to receive the input data address associated with a read request for the input data stored in the memory, and
    an address regeneration unit configured to generate a regeneration address signature based upon bit and word lines driven when the input data is read from the memory, wherein the signature analysis unit is further configured to receive the regeneration address signature and compare the input address signature with the regeneration address signature and generate a second error signal if the comparison produces a mismatch, wherein the input address signature is based upon the input data address.

14. The system according to claim 13, further comprising a port logic unit coupled to the signature analysis unit, the port logic unit configured to generate a device disable signal based upon the first error signal.

15. The system according to claim 13, further comprising a re-fetch/anti-lockup unit coupled to the signature analysis unit, the re-fetch/anti-lockup unit configured to repeat the read request for the input data stored in the memory based upon the second error signal.

16. A method for processing data by a microcontroller, the microcontroller having a processing unit, the method comprising:
    sending an input data address to a memory as part of a read request for input data stored in the memory;
    receiving the input data from the memory;
    generating a plurality of trace signals, wherein one or more of the plurality of trace signals are based upon the input data, the input data address, one or more internal processing states of the processing unit, an output data and an output data address;
    generating a first plurality of signatures comprising an input address signature based upon the plurality of trace signals;
    receiving a second plurality of signatures from a second microcontroller;
    comparing a signature of the first plurality of signatures to a corresponding signature of the second plurality of signatures;
    generating a first error signal if the comparison produces at least one mismatch;
    utilizing the first error signal to generate one or more disable signals for disabling operation of one or more devices under control of the microcontroller;
    receiving a regeneration address signature from the memory;
    comparing the regeneration address signature with the input address signature;
    generating a second error signal if the comparison produces a mismatch; and
    utilizing the second error signal to repeat the sending of the input data address to the memory as part of a second read request for the input data stored in the memory.

17. The method according to claim 16, wherein the first plurality of signatures comprises an input data signature, a processing state signature, an output data signature, and an output address signature.

18. The method according to claim 17,
    wherein the regeneration address signature is based upon bit and word lines driven in the memory when the input data is read from the memory.

19. A system for processing data by a microcontroller, the microcontroller having a processing unit, the system comprising:
    means for sending an input data address to a memory as part of a read request for input data stored in the memory;
    means for receiving the input data from the memory;
    means for generating a plurality of trace signals, wherein one or more of the plurality of trace signals are based upon the input data, the input data address, one or more internal processing states of the processing unit, an output data and an output data address;

means for generating a first plurality of signatures based upon the plurality of trace signals, wherein the first plurality of signatures comprises an input data signature, an input address signature, a processing state signature, an output data signature, and an output address signature;

means for receiving a second plurality of signatures from a second microcontroller;

means for comparing each a signature of the first plurality of signatures to each a corresponding signature of the second plurality of signatures;

means for generating a first error signal if the comparison produces at least one mismatch;

means for utilizing the first error signal to generate one or more disable signals for disabling operation of one or more devices under control of the microcontroller;

means for receiving a regeneration address signature from the memory;

means for comparing the regeneration address signature with the input address signature;

means for generating a second error signal if the comparison produces a mismatch; and means for utilizing the second error signal to repeat the sending of the input data address to the memory as part of a second read request for the input data stored in the memory.

20. The system according to claim 19, wherein the regeneration address signature is based upon bit and word lines driven in the memory when the input data is read from the memory.

* * * * *